United States Patent [19]

Johnson

[11] Patent Number: 5,039,798
[45] Date of Patent: Aug. 13, 1991

[54] OXYGEN BRIDGED NAPHTHALOCYANINE DIMERS AND THEIR USE IN OPTICAL INFORMATION STORAGE MEDIA

[75] Inventor: Robert E. Johnson, Hoboken, N.J.

[73] Assignee: Hoechst Celanese Corp., Somerville, N.J.

[21] Appl. No.: 487,355

[22] Filed: Mar. 1, 1990

[51] Int. Cl.⁵ .................. G03G 15/06; C07D 487/22; C09B 47/04
[52] U.S. Cl. .................................... 540/123; 540/128; 540/139; 430/78
[58] Field of Search .................. 540/139, 128, 123; 430/74, 78

[56] References Cited

U.S. PATENT DOCUMENTS

| | | | |
|---|---|---|---|
| 4,132,842 | 1/1979 | Wynne et al. | 540/128 |
| 4,492,750 | 1/1985 | Law et al. | 430/494 |
| 4,622,179 | 11/1986 | Eda | 540/139 |
| 4,900,817 | 2/1990 | Batzel et al. | 540/139 |

OTHER PUBLICATIONS

Cooper, Spectroscopic Techniques for Organic Chemists, [J. Wiley & Sons, N.Y. 1980]p. 243.

Morrison & Boyd, Organic Chemistry (Boston, Allyn and Bacon, 1979) pp. 556-558.
Markiewicz et al., Tetrahedron Letters 29 (13) pp. 1561-1564, 1988.

*Primary Examiner*—Mukund J. Shah
*Assistant Examiner*—Edward C. Ward
*Attorney, Agent, or Firm*—P. S. Kalyanaraman

[57] ABSTRACT

Provided are novel naphthalocyanine dimer compounds of the general formula:

RO—YNc—O—NcY—OR  (I)

wherein Nc represents a naphthalocyanine moiety, which can be substituted or unsubstituted; Y represents a central hetero atom of the naphthalocyanine moiety; and, OR represents an alkoxide cap bonded to the central hetero atom Y, with the first carbon atom of the alkoxide (OR) capping group being a tertiary carbon. Also provided is a method for preparing the dimer compounds, which method comprises reacting a naphthalocyanine dihalide in solution with a tertiary alcohol and a nucleophile. The process efficiently and reproducibly provides a naphthalocyanine oxo-bridged dimer having terminal alkoxide caps.

3 Claims, No Drawings

OXYGEN BRIDGED NAPHTHALOCYANINE DIMERS AND THEIR USE IN OPTICAL INFORMATION STORAGE MEDIA

BACKGROUND OF THE INVENTION

The present invention pertains to naphthalocyanine dimer compounds, and their use in optical recording media. More particularly, the present invention relates to naphthalocyanine oxo-bridged dimer compounds represented by the general formula:

RO—YNc—O—NcY—OR     (I)

and the use of such compounds in the information layer of an optical information recording medium. The present invention also relates to a novel process for the preparation of such naphthalocyanine oxo-bridged dimer compounds.

The recording medium, of course, is one of the key elements in any optical information storage system. The commercial viability of the recording medium depends upon such technical parameters as the sharpness in recording and playback of the information, i.e., a high signal to noise ratio. Dyes and pigments have accordingly been employed in information layers of recording media, often to enhance the sensitivity of the recording layers at the particular wavelength of the laser being used, which results in a much sharper recording and playback of information.

For example, U.S. Pat. No. 4,492,750 discloses an infrared sensitive optical recording composition containing as a component thereof a dispersion of a resinous binder and a soluble naphthalocyanine substituted on its aromatic rings with hydrogen or alkyl groups containing from 4 to about 8 carbon atoms. The central group of the naphthalocyanine compound is two hydrogen atoms, a divalent, trivalent, or tetravalent metal complex.

U.S. Pat. No. 4,622,179 discloses a naphthalocyanine compound wherein straight chain or branched chain alkyl groups of 5 to 12 carbon atoms are substituted on its aromatic rings with a metal such as Cu, Ni, Mg, Pb, Pd, V, Co, Nb, Al, Sn, In, Fe, and Ge, or its oxide, chloride or bromide, forming the central group of the naphthalocyanine compound. The use of the naphthalocyanine compound as a dyestuff in optical disks is also disclosed.

U.S. Pat. No. 4,719,613 discloses a naphthalocyanine compound wherein an oxygen attached to straight chain or branched chain alkyl groups of 4 to 12 carbon atoms are substituted on its aromatic rings with a metal, metal oxide or metal halide forming the central group of the naphthalocyanine compound. The use of the naphthalocyanine compound as a dyestuff in optical disks is also disclosed.

U.S. Pat. No. 4,725,525 discloses a naphthalocyanine chromophore compound, e.g., a sulfonamidonaphthalocyanine having silicon or germanium as the central hetero atom, used as an information layer of the recording medium.

Lee Arnold Schechtman in his thesis Compounds, Poly(metallonaphthalocyanines) and Related Macrocyclic Compounds, August, 1983, Dept. of Chemistry, Case Western Reserve University, discloses a particular chromophore which absorbs light at the wavelength of about 770 nm, i.e., bis-tri-n-hexylsiloxysilicon naphthalocyanine. The suitability of such a chromophore for use in an optical recording medium, however, has heretofore not been suggested or explored.

While dyes or pigments have been employed in information storage layers of optical recording media due to their excellent absorption properties, the search for an improved dye or pigment exhibiting stability and intense absorption, as well as commercial viability due to its ease of preparation and reproducibility in said preparation synthesis, is continuously ongoing.

Accordingly, it is an object of the present invention to provide naphthalocyanine compounds which can be prepared directly and easily, without the need for extreme precautions.

It is also an object of the present invention to provide dimer naphthalocyanine compounds exhibiting good stability and a usefulness in optical information storage media.

In another object of the present invention, a process for preparing such a dimer naphthalocyanine compound efficiently and inexpensively is provided, whereby the process uses a naphthalocyanine dihalide precursor.

Still another object of the present invention is to provide a novel process for efficiently and effectively, as well as reproducibly, preparing a naphthalocyanine compound which is extremely useful in optical recording media applications, which compound absorbs at a wavelength of about 780 nm.

These and other objects, as well as the scope, nature and utilization of the invention, will be apparent to those skilled in the art from the following description and the appended claims.

SUMMARY OF THE INVENTION

In accordance with the foregoing objectives, there are provided novel naphthalocyanine dimer compounds of the general formula RO—YNc—O—NcY—OR     (I), wherein
Nc represents a naphthalocyanin moiety, which can be substituted or unsubstituted;
Y represents a central hetero atom of the naphthalocyanine moiety, and
OR represents an alkoxide cap bonded to the central hetero atom Y.

It is extremely important for the purposes of the present invention that the first carbon atom of the alkoxide (OR) cappinq group be a tertiary carbon.

In another embodiment of the present invention, a method for preparing the foregoing naphthalocyanine compounds is provided, which process comprises reacting a naphthalocyanine dichloride in solution with a tertiary alcohol and a nucleophile. The process efficiently and reproducibly provides one with a naphthalocyanine oxo-bridged dimer having terminal alkoxide caps. It has surprisingly been found that the dimers are reproducibly formed only when tertiary alcohols are used as the reactants in the foregoing reaction sequence.

In another embodiment of the present invention, an optical information storage medium is provided comprising an information layer. The information layer is comprised of a naphthalocyanine oxo-bridged dimer having terminal alkoxide caps, i.e., the naphthalocyanine dimer compound of formula (I). The use of the naphthalocyanine oxo-bridged dimer compound in the information layer of an optical information storage medium provides for intense absorption of light, thereby making a very sensitive recording medium. Furthermore, the compound has been found to possess the chemical and photolytic stability, as well as film-forming properties, necessary for a chromophore useful in optical information layers. The ease with which the naphthalocyanine oxo-bridged dimer chromophores can be prepared, and the reproducibility of said synthesis, also enhances its commercial viability and desirability.

DETAILED DESCRIPTION OF THE PREFERRED EMBODIMENTS

The naphthalocyanine oxo-bridged dimer chromophores of the present invention are of the general formula (I)

RO—YNc—O—NcY—OR    (I)

In the foregoing general formula, the Nc represents a naphthalocyanine moiety. This moiety can be substituted or unsubstituted at any of the positions on the aromatic rings. In general, it is preferred that the naphthalocyanine moiety remains unsubstituted. However, substituents such as halogens, aliphatic, alicyclic or aromatic substituents containing from 1 to about 12 carbon atoms, can be present.

The Y represents a central hetero atom of the naphthalocyanine moiety, and can be silicon, any of the Group III or Group IV metallic elements, or any of the transition metals. It is most preferred that the central hetero atom be silicon, germanium or tin, with silicon, even though it is not considered a metal, being the most preferred central hetero atom.

The O's represent oxygen and the R groups represent the carbon residues of a tertiary alcohol. The terminal OR groups, therefore, represent the terminal alkoxide caps.

Structurally, therefore, the dimer compounds of the present invention can be represented as follows:

in an optical recording medium. The chemical stability and photolytic stability of the compounds in such an information layer also make the compounds excellent candidates for use in optical recording media. The naphthalocyanine dimer compounds of the present invention also exhibit very intense absorption at wavelengths in the range of from about 700 to 850 nanometers, and most particularly about 780 nanometers.

The method of the present invention used in preparing the naphthalocyanine oxo-bridged dimer compounds of the present invention is also greatly advantageous in its efficiency, reproducibility and simplicity. The method comprises reacting a naphthalocyanine dihalide together with a tertiary alcohol and a nucleophile. The reaction of the three components is conducted in solution. The reaction provides a naphthalocyanine oxo-bridged dimer with terminal alkoxide caps as a direct product, which product can be separated from the reaction solution. The terminal alkoxide caps (the OR groups in the foregoing formula (I)) are the alkoxide residues of the tertiary alcohol used in the reaction. The NcY moieties in the general formula (I) are taken from the naphthalocyanine dihalide reactants, with the Y hetero atom being the Y hetero atom used in said naphthalocyanine dihalide precursor or reactant.

The tertiary alcohol used in the reaction can be any tertiary alcohol. The alcohol chosen is generally that alcohol which will give the terminal alkoxide caps desired in the final oxo-bridged dimer product. The tertiary alcohol can include aromatic moieties, aliphatic moieties or alicylic moieties or which contain from about 4 to about 20 carbon atoms. The most important requirement, however, is that the alcohol is a tertiary alcohol. If a primary or secondary alcohol is used in the reaction sequence, the naphthalocyanine oxo-bridged dimers of the present invention would not be obtained.

The naphthalocyanine dihalide reactant can be any naphthalocyanine dihalide. The most preferred dihalide is a dichloride reactant. The central hetero atom of the naphthalocyanine moiety can be any of those described above, with silicon being the most preferred.

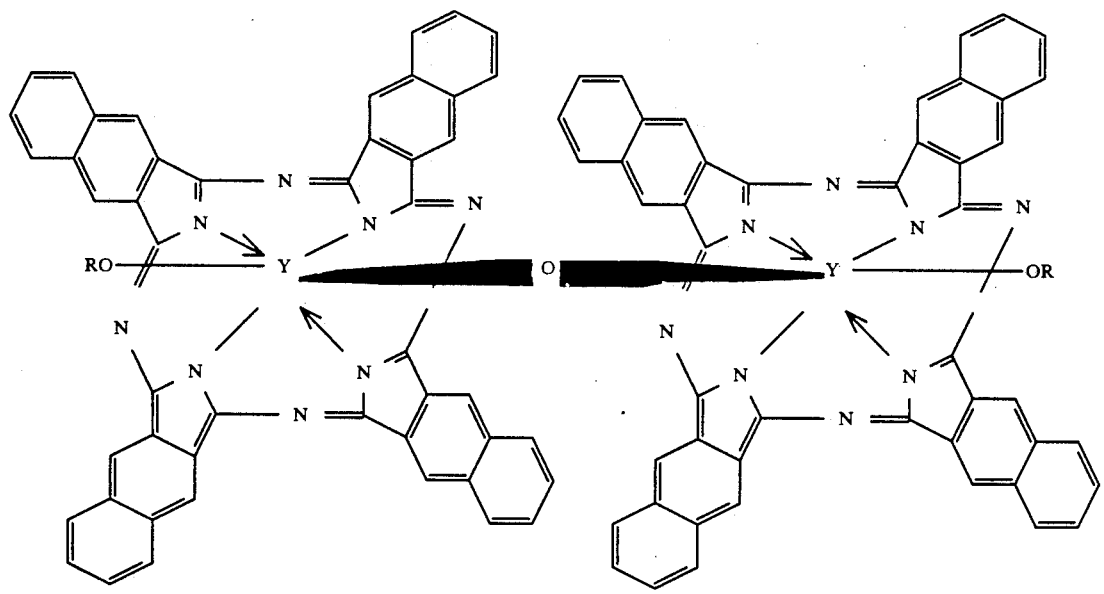

The naphthalocyanine oxo-bridged dimer compounds having the terminal alkoxide caps exhibit excellent optical properties when cast as an information layer The nucleophile used in the reaction process of the present invention is any suitable nucleophile. Examples of suitable nucleophiles include, but are not limited to, metal amides, metal hydrocarbons, metal hydroxides, metal siloxantes or metal alkoxides. The most preferred nucleophiles are potassium triethyl siloxante, lithium amide and lithium alkoxide, with lithium amide ($LiNH_2$) being the most preferred.

The three reactants are preferably reacted in solution. A suitable solvent for all three reactants is preferred to be used. Examples of suitable solvents in accordance with the present invention would include pyridine, methylene glycol, methylene diglycol, and tributylamine, the most preferred solvent being pyridine. The reaction solution can, however, involve more than one solvent, as long as the solvents are miscible.

A general illustrative example of the reaction of the present invention involves the reaction of 2 moles of silicon naphthalocyanine dichloride, with 3 moles of 1-methyl,1-hydroxybenzene in 4 moles lithium amide ($LiNH_2$). The three reactants are reacted in a pyridine solution, and form a silicon naphthalocyanine oxo-bridged dimer having terminal alkoxide caps as follows:

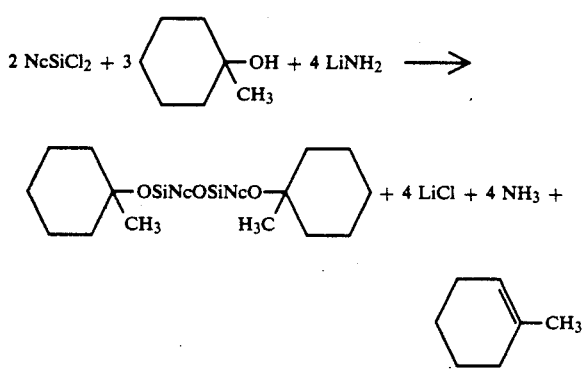

In general, the reaction in solution can be made following conventional procedures known in of the art. For example, the reaction process can be conducted as follows:

The reaction sequence is commenced by first suspending/dissolving the naphthalocyanine dihalide and the nucleophile separately in suitable solvents. As discussed previously, it is preferable if the same solvent is used to dissolve both the naphthalocyanine precursor and the nucleophile. It is also preferred to use an excess of the solvent to insure quick and complete dissolution of the reactants. The separate naphthalocyanine and nucleophile mixtures are then slowly combined in a vessel. The combined solution of the nucleophile and naphthalocyanine mixtures is continuously agitated during and after the combination of the two mixtures. The combined naphthalocyanine and nucleophile solution is stirred and repeatedly purged of air and kept under argon to facilitate the reaction and to avoid any adverse reaction with impurities in the air.

The next step in the reaction sequence is the addition of a tertiary alcohol to the combined mixture of naphthalocyanine dihalide and nucleophile. The tertiary alcohol is dissolved in a solvent and slowly added to the reaction mixture while continuing to stir and purge the solution of air. Once again it is preferred to completely dissolve the alcohol in the same solvent that is used to dissolve the naphthalocyanine dihalide and nucleophile.

The resulting reaction solution is then preferably refluxed for a period of time sufficient to allow a capped naphthalocyanine species to dissolve and react almost completely in the reaction mixture. The amount of time necessary for the dissolution and reaction of the capped naphthalocyanine species can range from about 15 minutes to 1 week, and preferably ranges from about one hour to about two days. It is believed that two nearby surface monocapped species interact with another tertiary alcohol in solution, incorporate its oxygen to complete an oxo-bridge, and thereby result in the general alcohol elimination product of general formula (I).

In conducting the reaction between the three reactants, it is preferred to use an excess amount of the alcohol and nucleophile. Such excess amounts have been found to aid in the reaction, without adversely effecting the product.

The naphthalocyanine product is then recovered by any conventional method of recovery, e.g., filtration and reprecipitation. It is preferred to filter the solution while it is still hot. The appropriate filter includes any filter that excludes all particles of size greater than approximately 0.6 microns. A second precipitation with water may also be preformed to cleanse the naphthalocyanine product of impurities.

The next step in the recovery is to slurry the naphthalocyanine product with water, alcohol or both in series. The purpose behind forming a water or alcohol slurry as part of the recovery process is to further strip any impurities from the naphthalocyanine product. It is the preferred recovery method of the present invention to first slurry the naphthalocyanine product with fresh water and second with methanol.

The recovery process is completed by drying, redissolving in an organic solvent such as trichloroethane so that a final filtration and reprecipitation can be performed, and redrying the product. Any means for drying and filtering the product may be used in accordance with the present invention but it is preferred if the product is first air dried followed by a filtration and reprecipatation accomplished through the use of a suitable solvent such as 1,1,2-trichloroethane. It is also preferred to use a hot solvent solution so as to dissolve the maximum amount of the naphthalocyanine product into solution. It is desirable to filter out all particles greater than approximately 0.6 $\mu$m in size, therefore a filter such as a Whitman GF/F filter is used. The preferred means for the final drying of the product is a vacuum dry process. The vacuum dry process keeps the product from obtaining any impurities during its final stage in the recovery. The result of vacuum drying the product of the present invention is a dark green oxo-bridged naphthalocyanine compound suitable for use as a chromophore in optical information recording media.

To employ the naphthalocyanine chromophore of the present invention in an optical information recording medium, it must be cast onto a suitable substrate material. Examples of suitable substrate materials include acrylic resins, methacrylic resins, polystyrene resins, polycarbonate resins, and cellulose resins. Polycarbonate resins, however, are the most preferred substrate materials.

Conventional methods of casting may be utilized with the naphthalocyanine chromophore of the present invention. If desired or deemed necessary, the chromophore of the present invention can be dissolved together with a polymer and cast accordingly on a suitable substrate. For successful coating, chromophore solutions of approximately 2 wt % are desirable, which is qualitatively judged by the dye's solubility in 1,1,2-trichloroethane. The chromophore can also be cast, per se, as a film on a suitable substrate, i.e., without the aid or presence of a film forming binder resin.

The film, when applied, must provide a very flat surface in order to avoid errors and noise. In order to facilitate the coating procedure when a polymer is cast together with the naphthalocyanine chromophore, it is generally advantageous that the polymer and chromophore be soluble in a readily available organic solvent such as an alcohol or ketone. In this regard the polymer and chromophore should be compatible and mutually co-soluble. Also, upon evaporation of the solvent, the chromophore should not precipitate in a particulate form, which particulates would cause a scattering of light. For this reason, the naphthalocyanine chromophore of the present invention is highly desirable. It can successfully be cast with or without the presence of a film-forming polymer to obtain a smooth layer that does not precipitate in particulate form. It is preferred according to the method of the present invention to cast the naphthalocyanine chromophore without the use of the film-forming binder resin.

Any suitable coating technique may be used to achieve such a flat surface, with a conventional technique such as spin coating, which allows for a high degree of control of film thickness and flatness, being preferred. It is, of coarse, important that a thin film coating is formed.

The substrate which is coated should generally possess a surface of suitable smoothness. This may be imparted by appropriate molding or other forming techniques when the substrate is made. If the substrate has an inadequately smooth surface, a smoothing or subbing polymer layer may be used to attain the appropriate smoothness. Such a smoothing or subbing layer should not, or course, interfere with application or utilization of the recording layer which is subsequently applied thereto. The subbing layer can contain preformatting information.

A suitable protective layer or cover, such as those known to the art, can also be used if desired to protect the recording layer form dirt, dust, scratches or abrasion.

The following examples are given to demonstrate the preparation of the naphthalocyanine dimer compounds of the invention. It is understood that these examples are given by way of illustration and are not meant to limit the disclosure or the claims to follow.

The standard procedure for preparation of the equipment used in the examples is as follows. A 500 ml round bottom flask with a side-arm stopcock was oven dried with a magnetic stirrer overnight. The flask was assembled with reflux condenser and further dried under a millitorr vacuum. The specific examples are as follows.

EXAMPLE 1

Silicon naphthalocyanine dichloride (3.000 g., 3.696 mmol), lithium amide (0.459 g., 20.0 mmol), and 1-methyl cyclohexanol (19.00 mmol) were added to the flask along with 150 ml of anhydrous pyridine. The contents were stirred and repeatedly purged of air while being kept under argon. The reaction was set to reflex for an hour and one half which caused the NcSiCl$_2$ to slowly dissolve in the pyridine. The combined mixture was refluxed for an additional hour. The contents were filtered while hot through a glass fiber filter excluding all particles over 0.6 microns in size. The deep green solution was then poured into 400 ml of distilled water to precipitate the dark green product. The solution was filtered a second time with a Whatman #2 filter followed by a warm water wash. A second washing in methanol was performed and the resulting product was air dried. This process yielded 1.43 g of an oxo-bridged naphthalocyanine dimer of the formula:

The product was analyzed by NMR and UV visible, and was found to comprise essentially the dimer, e.g., 95% or better. The $\lambda_{max}$ for UV absorption was 731 nm.

EXAMPLE 2

Silicon naphthalocyanine dichloride (3.000 g., 3.696 mmol), lithium amide (0.459 g., 20.0 mmol), and 3-ethyl,3-pentanol (19.00 mmol) were added to a flask along with 150 ml of anhydrous pyridine. The above contents were stirred and repeatedly purged of air while being kept under argon. The reaction was set to reflux for an hour and one half which caused the NcSiCl$_2$ to slowly dissolve in the pyridine. The combined mixture was refluxed for an addition hour. The contents were filtered while hot through a glass fiber filter excluding all particles over 0.6 microns in size. The deep green solution was then poured into 400 ml of distilled water to precipitate the dark green product. The solution was filtered a second time with a Whatman #2 filter followed by a warm water wash. A second washing in methanol was performed and the resulting product was air dried.

This process yielded 1.53 g of an oxo-bridged naphthalocyanine dimer of the formula (CH$_3$CH$_2$)$_3$COSiN-cONcSiOC(CH$_2$CH$_3$)$_3$. The product was analyzed by NMR and UV visible, and was found to comprise essentially the dimer, e.g., 95% or better. The $\lambda_{max}$ for UV absorption was 732 nm.

COMPARATIVE EXAMPLE 1

3.0 g. of silicon napththalocyanine dichloride (3.696 mmol), 0.459 g. of lithium amide (20 mmol) and 4.607 g. (19.0 mmol) of the secondary alcohol 2 hexadecanol or added to a flask along with 150 mils of anhydrous pyridine. The above contents were stirred and repeatedly purged of air while being kept under argon. The reaction was set to reflux for an hour and one half which caused the silicon napththalocyanine dichloride to slowly dissolve in the pyridine. The combined mixture was then refluxed for an additional hour. The contents were filtered while hot through a glass fiber filter excluding all particles over 0.6 microns in size. The deep green solution was then poured into 400 mils of distilled water to precipitate the dark green product. The solution was filtered a second time with a Whatman #2 filter followed by a warm water wash. A second washing in methanol was performed and the resulting product was air dried.

This process yielded 1.6 g. of a dicapped monomer product of the formula

NcSi[OCHCH₃(CH₂)₁₃CH₃]₂.

The product was analyzed by NMR and UV visible, and with the $\lambda_{max}$ for UV absorption being about 780 nm.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A naphthalocyanine oxo-bridged dimer compound of the formula

OR—YNc—O—NcY—OR    (I)

wherein Nc represents a naphthalocyanine moiety;
Y is selected from the group consisting of silicon, group III metals, group IV metals or transition metals; and,
OR represents an alkoxide cap bonded to the atom Y with OR being the residuum of a tertiary saturated alcohol having from 4 to 20 carbon atoms.

2. The dimer compound according to claim 1, wherein Y is silicon, tin or germanium.

3. The dimer compound according to claim 1 wherein Y is silicon.

* * * * *